United States Patent [19]

Schäfer

[11] 4,173,245
[45] Nov. 6, 1979

[54] APPARATUS FOR MOUNTING AND DISMOUNTING VEHICLE TIRES

[76] Inventor: Wilhelm Schäfer, Buchenstrasse 1, D-6349 Herbornseelbach, Fed. Rep. of Germany

[21] Appl. No.: 843,674

[22] Filed: Oct. 19, 1977

[30] Foreign Application Priority Data

Oct. 28, 1976 [DE] Fed. Rep. of Germany ....... 2648897

[51] Int. Cl.² ............................................. B60C 25/08
[52] U.S. Cl. ................................................ 157/1.24
[58] Field of Search ........................ 157/1.1, 1.17, 1.2, 157/1.24

[56] References Cited

U.S. PATENT DOCUMENTS

| 3,807,478 | 4/1974 | Mott | 157/1.2 X |
| 3,814,163 | 6/1974 | Charles et al. | 157/1.1 |
| 3,937,264 | 2/1976 | Mikovits et al. | 157/1.1 |
| 4,047,553 | 9/1977 | Kotila | 157/1.24 |

FOREIGN PATENT DOCUMENTS 2320201  3/1977  France ..................... 157/1.17

*Primary Examiner*—James G. Smith
*Attorney, Agent, or Firm*—Young & Thompson

[57] ABSTRACT

Apparatus for mounting and dismounting vehicle tires, comprises a disc on which the tire is releasably clamped by screw-threaded members, and means to rotate the disc about a vertical axis. A roller arranged generally radially of the axis of the tire, with the axis of the roller horizontal, engages the bead of the tire to flex the tire for mounting and dismounting the tire from its rim. The roller is mounted for bodily vertical movement on a vertical spindle in a direction parallel to the axis of the disc on which the tire is mounted, and also for horizontal swinging movement about an axis adjacent its end remote from the axis of the tire.

8 Claims, 8 Drawing Figures

APPARATUS FOR MOUNTING AND DISMOUNTING VEHICLE TIRES

The invention relates to apparatus for the mounting and dismounting of automobile tires with a device for clamping a rim and with a tool which engages the tire.

Conventional machines of the aforementioned type have a complicated structure and require an expensive operation. To mount or dismount the tires on or off the rims, several tools are provided, some to be brought into engagement with the tires from above and some from below, so that they must be mutually displaceable.

The invention is based on the problem of simplifying the construction and operation of such an apparatus so that a complete change of a tubeless truck or bus tire can be effected within a minimum period of time.

The thus-posed problem is solved according to this invention, in an apparatus of the type described hereinabove, by providing that the tool engaging the tire is fashioned as a flexing roller arranged so that it can be lifted and lowered in parallel to the axis of a rotationally drivable stepped disk and can be pivoted outwardly in the lateral direction.

The rim to be worked on is suitably attached to the stepped disk by means of screws.

Furthermore, the stepped disk is driven by way of a chain drive installed in a side section of the lower machine frame, and a reciprocating spindle is provided for the reciprocating motion of the flexing roller.

To limit the pivotal motion of the flexing roller, hidden stops are arranged so that injuries, for example pinching of fingers, are avoided.

To restrict manual work to a minimum, it is possible to provide at the lower machine frame a rapid-action lifting means operable by means of a pressure medium cylinder, for the rim, the tire, and/or the complete wheel.

In this connection, the rapid-action lifting means can comprise a plate having several insert bores for a supporting roller holder; a supporting roller, which supports the tire, is freely rotatably mounted to the end of this holder facing away from the insert end.

In order to avoid, especially in case of very large tires, any damage to the tire along the sharp edge of the rim, a tire guiding plate is provided which can be attached in the center of the stepped disk drive mechanism by means of a thumbscrew and covers flush and concentrically the respectively upper edge of the rim.

The tire guiding plate can have at least two insert holes for tire-holding bolts. Furthermore, this plate comprises at least one cutout to suspend a mounting clip for the tire in its peripheral edge, this clip hanging on a safety cable.

Furthermore, the machine can be equipped with a rapid-action tire inflating device so that in each instance a completely changed tire, inflated with the corresponding air pressure, leaves the machine. The tire mounting and dismounting machine makes it possible to accomplish a tire change in a minimum period of time and therefore is particularly suitable for municipal traffic and supply operations with a large motor pool.

Embodiments of the machine of this invention are illustrated in the drawings wherein:

FIG. 7 shows this accessory in a lateral view with a tire, while

Figure 1:
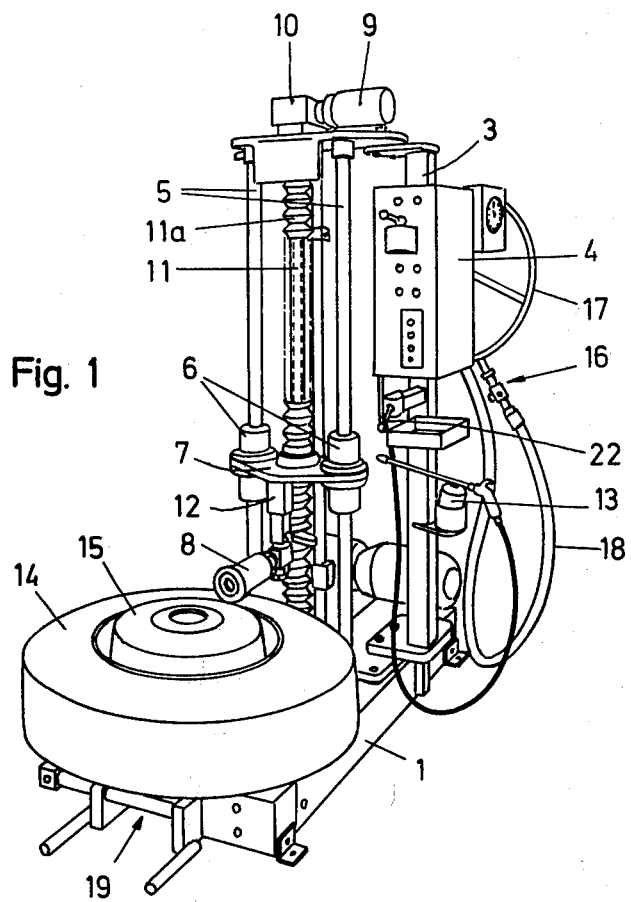
FIG. 1 shows a total view of a machine according to this invention.

The tire mounting and dismounting machine according to FIG. 1 comprises a lower machine frame 1 requiring neither a special foundation nor an attachment to the ground. At the front end of the lower machine frame 1, a stepped disk 2 (see FIG. 2) is supported to be rotatable about a perpendicular axis and is driven by way of a chain drive, not shown, with guide rollers, this chain drive being arranged in a box-shaped lateral part of the lower machine frame 1. At the rear end of the machine frame 1 a vertical machine stand 3 is provided carrying the switch box 4 with the electrical operating devices. Two guide rods 5 extend over the length of the machine stand 3 in parallel thereto; a flexing roller 8 is displaceably guided on these rods by way of guide bushings 6 and a crossbar 7. The flexing roller can be moved up and down by means of an electric motor 9 and a gear mechanism 10 via a reciprocating spindle 11 shielded by a folded bellows 11a. The flexing roller 8 is seated on a pivot pin 12 attached to the crossbar 7 and having hidden stops (not shown) to limit the pivoting motion.

Accessories operated with compressed air for the mounting and dismounting of tires are attached to the machine stand 3, namely a spray gun 13, by means of which a tire 14 and a rim 15 can be sprayed with lubricant to facilitate the mounting and dismounting of the tire 14; furthermore a rapid-action tire inflating device 16 with an air nozzle ring 17 and a large-volume connecting hose 18.

Furthermore, a rapid-action lifting means 19 is arranged at the front of the lower machine frame 1, by means of which the complete wheel or the rim 15 or the tire 14 can be lifted onto the stepped disk 2. The rapid-action lifting means 19 is mounted to be pivotable about horizontal pivot pins 20, wherein the unit is driven by means of a pneumatic cylinder 21 actuated with a switching lever 22 (FIG. 1). The rapid-action lifting means 19 is illustrated in the drawings in the lower rest position and correspondingly the switching lever 22 is shown in the turned-off position.

Figure 2:
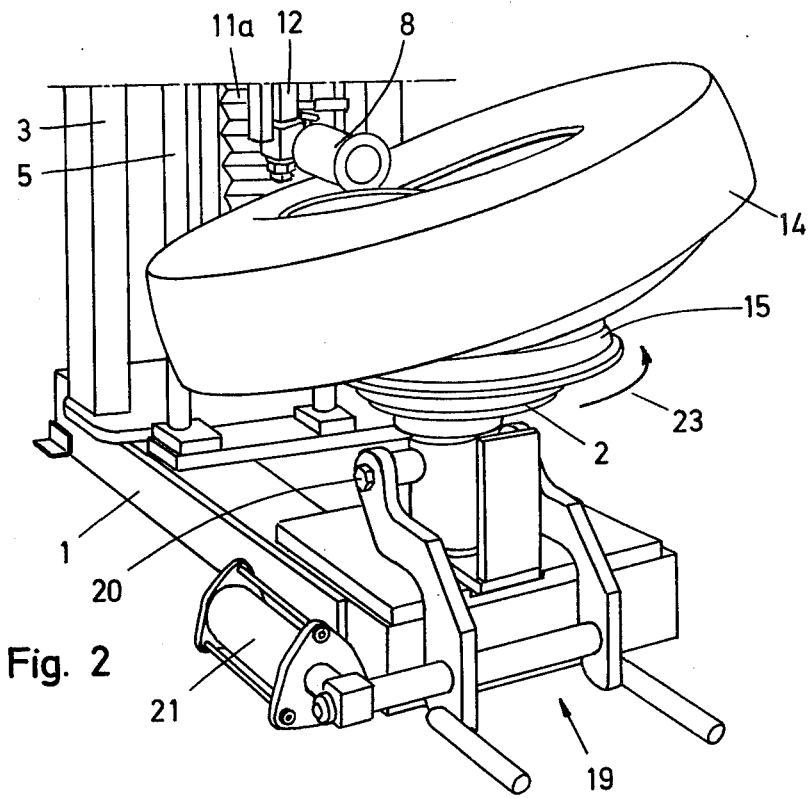
FIG. 2 shows a fragmentary view of the machine in a first phase of tire mounting.

FIG. 2 shows the first phase during the mounting of a truck or bus tire 14. The stepped disk 2 is turned in the direction of arrow 23 together with the rim 15 threadedly attached to the disk, after the flexing roller 8 has been lowered into the operating position. In this mounting phase, the lower bead of the tire is pressed over the edge of the rim. The upper tire bead initially rises again behind the flexing roller 8.

Figure 3:
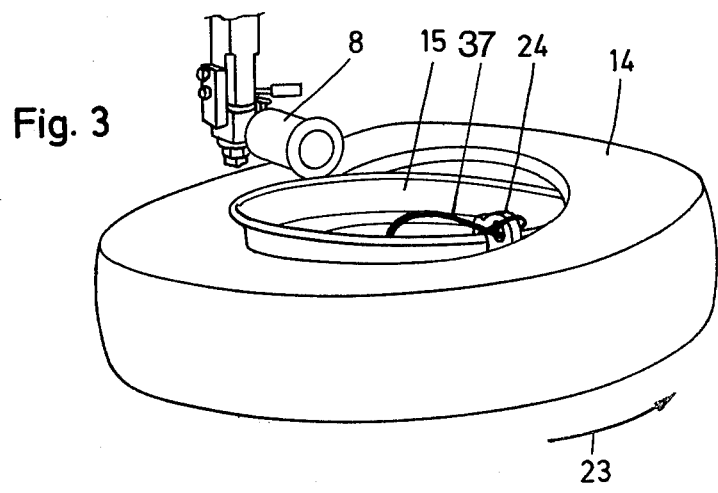
FIG. 3 shows another phase of the tire mounting step.

In the second phase of the tire mounting operation shown in FIG. 3, the upper tire bead is now also pressed over the edge of the rim. At the beginning of this mounting phase, a holding clip 24 (also called bead holder) is hung over the edge or "horn" of the rim directly behind the flexing roller 8, as seen in the peripheral direction. In this way, the upper tire bead is prevented from jumping out in the circumferential direction behind the flexing roller 8. Once the upper tire bead has been mounted as well, the tire can be inflated with air by means of the rapid-action inflating device 16 (FIG. 1). Before the tire is inflated, the holding clip 24 is unhung, which can be easily accomplished since the top bead of the tire 14 hangs loosely in the rim 15. During the inflation of the tire 14 with air, a brief air jet is blown into the tire 14 by way of the air nozzle ring 17, attached around the rim edge on the tire 14 and retained at that location, through holes (not shown) provided all around the air nozzle ring 17, so that the tire beads contact the rim 15. At the same time, air is introduced up to the desired pressure by way of the normal tire inflation valve and a separate connecting hose.

Figure 4:
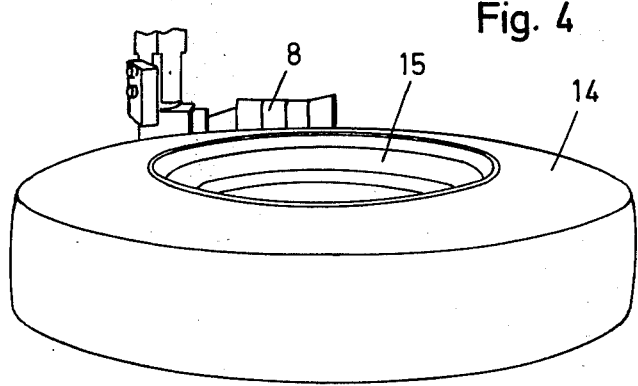
FIG. 4 shows a phase of the tire dismounting operation.

Since the dismounting of the tire 14 from the rim 15 must be executed in the upward direction so that the tire can be carried off, the flexing roller 8 is pivotably supported. FIG. 4 shows the flexing roller 8 in the outwardly pivoted position. In this latter position, the roller is moved downwardly after it has detached the top tire bead from the rim 15 with a scant revolution of the stepped disk 2. In the position beneath the tire 14, the flexing roller 8 is again pivoted inwardly and moved from below toward the tire 14 to such an extent that, during a further revolution of the stepped disk 2, the lower tire bead is detached from the rim 15 as well. During the further revolution of the stepped disk 2, the flexing roller 8 is moved upwardly until both tire beads, i.e. the entire tire 14, has been removed from the rim 15.

During the mounting of a new tire 14, the rapid-action lifting means 19 constitutes a special aid, since this lifting means places the new tire 14, without manual work, obliquely on the rim 15 in the starting position. If a rim 15 with a tire 14 mounted thereon must be placed on the stepped disk 2 for the tire change, the rapid-action lifting means 19 is practically indispensable. Each phase of the dismounting or mounting of a tire requires only a scant revolution of the stepped disk 2, which latter can, if desired, also be driven in the other direction of rotation (in oposition to the arrow 23). Experiments with a prototype of the machine of this invention showed that merely 2.5–3 minutes are necessary for a complete tire change including the dismounting of the old tire and the mounting of the new tire, including inflation.

The flexing roller 8 is of a conventional type of construction. A hollow shaft, on which several freely rotatable annular elements are disposed, is arranged on a journal for adaptation to the different tire sizes to be displaceable and fixable into position, so that all current truck and bus tires can be changed.

Figure 5:
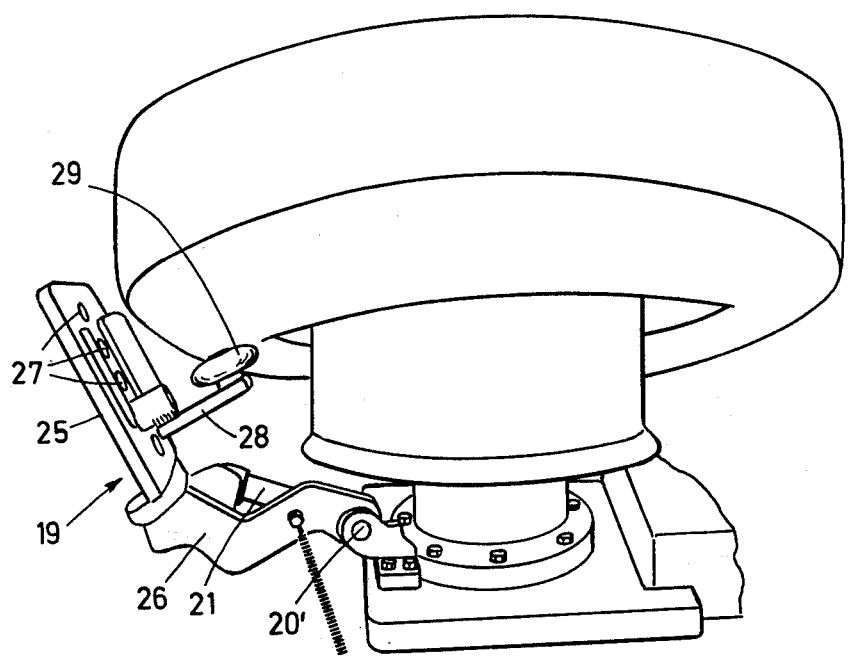
FIG. 5 shows another embodiment for the rapid-action lifting means.

FIG. 5 shows a further developed embodiment of the rapid-action lifting means 19, comprising a plate 25 which is mounted to a lever arm 26 to be pivotable about a pivot pin 20' at the gearbox of the stepped disk drive and includes several insert holes 27 for a supporting roller holder 28 with a supporting roller 29 freely rotatably mounted on the free end. The insert holes 27 are grooved, and a wedge at the cotter pin of the supporting roller holder 28 can engage each of these grooves, so that the holder is secured against rotation. When a particularly heavy tire is being mounted, the supporting roller 29 is of great use, as shown in FIG. 5.

Figure 6:
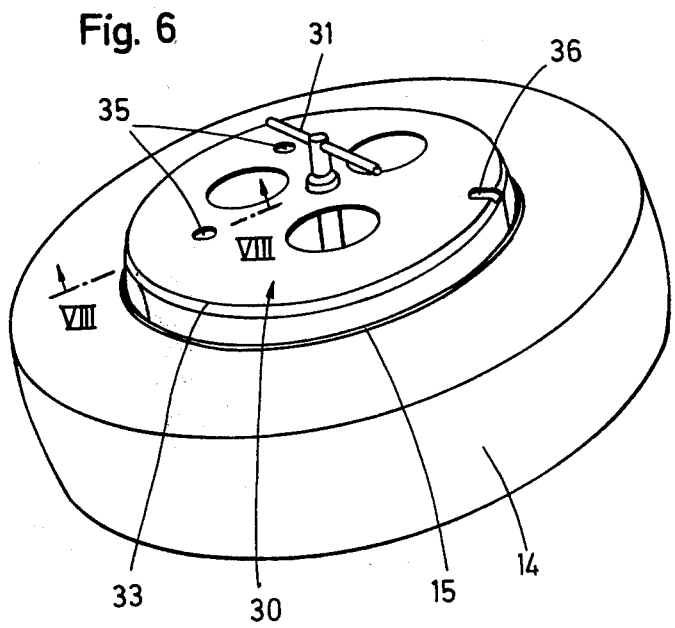
FIG. 6 shows another accessory (tire guiding plate) for the machine of this invention.

In case of heavy tires and sharp-edged rim edges, it can happen that the tire bead is damaged during mounting. To avoid this disadvantage, a tire guiding plate 30 is provided which is shown in a perspective view in FIG. 6 and in a lateral view in FIG. 7 and which can be screwed in place in the center of the stepped disk drive mechanism with the aid of a thumbscrew 31. As shown in FIG. 8, the tire guiding plate 30 is centered on the edge of the rim 15 by means of an annular indentation 32. The upper peripheral edge 33 of the tire guiding plate 30 is rounded so that the tire bead is not damaged.

Figure 7:
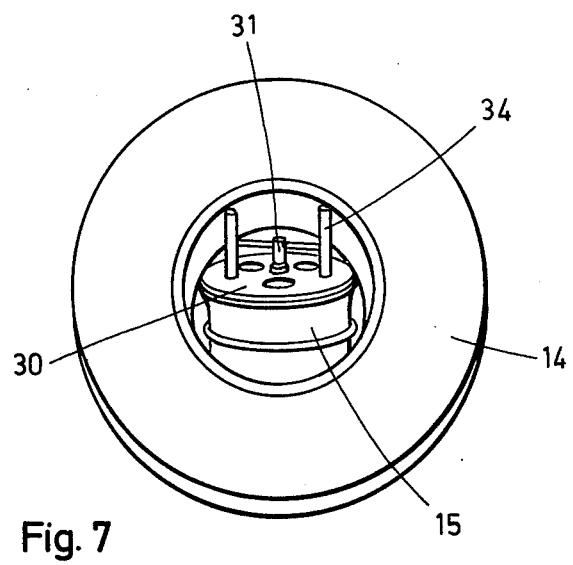
Figure 8:
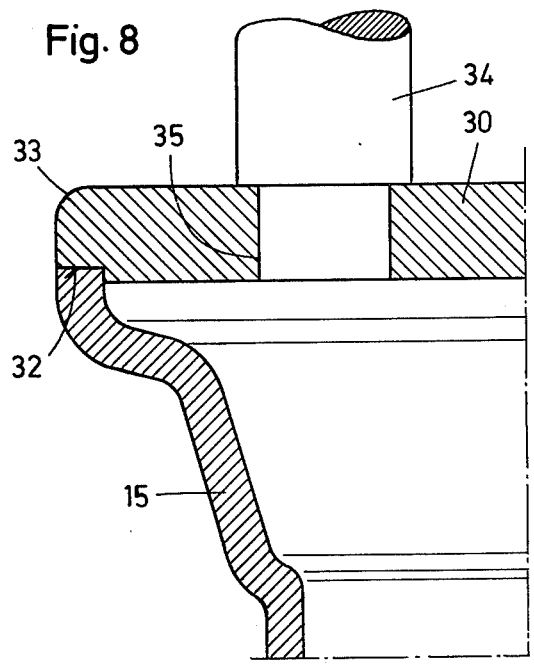
FIG. 8 shows a section along line VIII—VIII of FIG. 6.

Once a heavy tire 14 has been lifted obliquely upon the rim 15 with the aid of the rapid-action lifting means 19, as shown in FIG. 7, it can be prevented from sliding off the rim 15 by means of tire holding bolts 34. The tire holding bolts 34 can be inserted in plug-in holes 35 of the tire guiding plate 30, as also shown in FIG. 8.

Furthermore, a cutout 36 is provided in the peripheral edge 33 of the tire guiding plate 30 so that the holding clip 24 (see FIG. 3) can be hung into this cutout; the holding clip 24 hangs on a safety cable 37 which can be attached to the rim 15 or to the stepped disk 2 and prevents the holding clip 24 from being flung away if it should slide off the edge of the rim.

What is claimed is:

1. Apparatus for the mounting and dismounting of vehicle tires, comprising a machine frame, a horizontal disc carried by said machine frame on which a tire rim can be releasably mounted, means carried by said machine frame for rotating said disc about a vertical axis, a single horizontal roller carried by the machine frame adapted to engage the upper or lower bead of a tire on a tire rim carried by the disc, means carried by the machine frame for moving the roller vertically in either direction to position the roller to act on either the upper or the lower rim of a tire on the disc, and means carried by the machine frame mounting the roller for bodily horizontal movement into and out of positions in which the roller overlies or underlies a tire on the disc thereby to permit vertical travel of the roller past a tire on the disc.

2. Apparatus as claimed in claim 1, said means mounting said roller for bodily movement parallel to said axis comprising a spindle parallel to said axis, and a connection between said spindle and said roller whereby rotation of said spindle is translated to recilinear movement of said roller parallel to said axis.

3. Apparatus as claimed in claim 1, and a chain drive carried by said machine frame for rotating said disc.

4. Apparatus as claimed in claim 1, and rapid-action lifting means for a tire supported on said disc, means mounting said lifting means on said machine frame for vertical swinging movement about a horizontal axis, and power means for swinging said lifting means about said horizontal axis.

5. Apparatus as claimed in claim 4, in which said rapid-action lifting means comprises a plate with several insert holes for a supporting roller holder, and a supporting roller freely rotatably mounted at the end of the roller holder facing away from the insert end and forming the support of the tire.

6. Apparatus as claimed in claim 1, and a tire guiding plate which can be attached by means of a thumbscrew in the center of the disc and which covers the top edge of the tire bead concentrically and in a flush manner.

7. Apparatus as claimed in claim 6, said tire guiding plate having at least two insert holes for tire holding bolts.

8. Apparatus as claimed in claim 6, said tire guiding plate having at least one cutout for suspending a holding clip for the tire in its peripheral edge, and a safety cable to which said holding clip is linked.

* * * * *